(12) United States Patent
Boehlke

(10) Patent No.: US 6,346,970 B1
(45) Date of Patent: Feb. 12, 2002

(54) TWO-DIMENSIONAL ADJUSTABLE FLICKER FILTER

(75) Inventor: Kenneth A. Boehlke, Beaverton, OR (US)

(73) Assignee: Focus Enhancements, Inc., Campbell, CA (US)

(*) Notice: Subject to any disclaimer, the term of this patent is extended or adjusted under 35 U.S.C. 154(b) by 0 days.

(21) Appl. No.: 09/239,081

(22) Filed: Jan. 27, 1999

Related U.S. Application Data

(60) Provisional application No. 60/096,299, filed on Aug. 12, 1998.

(51) Int. Cl.[7] .......................... H04N 5/21; H04N 5/213; H04N 7/01
(52) U.S. Cl. .................... 348/447; 348/910; 348/607; 348/625; 348/441
(58) Field of Search .......................... 348/606, 607, 348/910, 446, 447, 448, 443, 445, 441, 625, 687; 382/263, 264; 345/214, 204; H04N 5/21, 5/213, 7/01

(56) References Cited

U.S. PATENT DOCUMENTS

| | | | |
|---|---|---|---|
| 3,953,668 A | | 4/1976 | Judice .......................... 178/6 |
| 4,300,162 A | | 11/1981 | Robers ........................ 358/160 |
| 4,412,251 A | | 10/1983 | Tanaka et al. ............... 358/160 |
| 4,672,446 A | | 6/1987 | Ikeda et al. .................. 358/140 |
| 4,783,840 A | * | 11/1988 | Song ............................. 382/54 |
| 4,788,540 A | | 11/1988 | Tokumitsu et al. .......... 340/789 |
| 4,799,105 A | | 1/1989 | Mitchell et al. ............. 358/160 |
| 4,831,435 A | * | 5/1989 | Song et al. ................... 358/140 |
| 4,947,251 A | | 8/1990 | Hentschel ..................... 358/166 |
| 4,949,167 A | * | 8/1990 | Isnardi et al. .................. 358/12 |
| 4,996,595 A | | 2/1991 | Naito et al. ................. 358/150 |
| 5,019,904 A | | 5/1991 | Campbell ..................... 358/140 |
| 5,029,001 A | * | 7/1991 | Tanaka et al. ............... 358/140 |
| 5,621,470 A | * | 4/1997 | Sid-Ahmed .................. 348/448 |
| 5,777,689 A | * | 7/1998 | Dunbar ........................ 348/625 |
| 5,781,241 A | | 7/1998 | Donovan ..................... 348/441 |
| 5,812,139 A | * | 9/1998 | Morimoto .................... 345/428 |
| 5,818,973 A | * | 10/1998 | Hsu ............................. 382/264 |
| 5,822,008 A | | 10/1998 | Inoue et al. ................. 348/446 |
| 5,912,744 A | * | 6/1999 | Nakane ........................ 358/447 |
| 5,914,753 A | * | 6/1999 | Donovan ..................... 348/441 |
| 5,963,262 A | * | 10/1999 | Ke et al. ...................... 348/447 |
| 6,002,442 A | * | 12/1999 | Li et al. ....................... 348/447 |
| 6,055,340 A | * | 4/2000 | Nagao ......................... 382/263 |
| 6,061,094 A | * | 5/2000 | Maietta ........................ 348/447 |
| 6,067,120 A | * | 5/2000 | Horikawa et al. ........... 348/447 |

FOREIGN PATENT DOCUMENTS

| | | | | |
|---|---|---|---|---|
| JP | | 0117229 | 1/1989 | ........... H04N/11/04 |

* cited by examiner

Primary Examiner—Reinhard J. Eisenzopf
Assistant Examiner—Jean W. Désir
(74) Attorney, Agent, or Firm—Smith-Hill and Bedell

(57) ABSTRACT

The invention is a flicker filter for use with video signals. The flicker filter of the invention has at least two user-adjustable inputs adapted to balance image quality versus flicker in the second video image. A first user-adjustable input is adapted to govern an amount of flicker suppression. A second user-adjustable input is adapted to govern an amount of blur, or sharpness. The two inputs are independently adjustable such that a user may dynamically adjust the two-dimensional system characteristics. This ability allows the circuit to be tune to adjust pixel intensities where an amount of pixel intensity adjustment increases with decreasing boundary angle, inter alia.

19 Claims, 4 Drawing Sheets

| 0 | 0 | 0 | 0 | 0 |
|---|---|---|---|---|
| 0 | 0 | 1 | 0 | 0 |
| 0 | 0 | 0 | 0 | 0 |

FIG. 7

| 0 | 0 | 1/4 | 0 | 0 |
|---|---|---|---|---|
| 0 | 0 | 1/2 | 0 | 0 |
| 0 | 0 | 1/4 | 0 | 0 |

FIG. 8

| 0 | 0 | FLK/4 | 0 | 0 |
|---|---|---|---|---|
| 0 | 0 | 1-FLK/2 | 0 | 0 |
| 0 | 0 | FLK/4 | 0 | 0 |

FIG. 9

| 1/32 | 1/16 | 1/16 | 1/16 | 1/32 |
|---|---|---|---|---|
| -1/16 | -1/8 | 7/8 | -1/8 | -1/16 |
| 1/32 | 1/16 | 1/16 | 1/16 | 1/32 |

FIG. 10

| 1/64 | 1/32 | 5/32 | 1/32 | 1/64 |
|---|---|---|---|---|
| -1/32 | -1/16 | 11/16 | -1/16 | -1/32 |
| 1/64 | 1/32 | 5/32 | 1/32 | 1/64 |

FIG. 11

| 0 | 0 | 0 | 0 | 0 |
|---|---|---|---|---|
| 0 | 0 | 0 | 0 | 0 |
| 1 | 1 | 1 | 1 | 1 |
| 1 | 1 | 1 | 1 | 1 |

FIG. 12

| 0 | 0 | 0 | 0 | 0 |
|---|---|---|---|---|
| 1/4 | 1/4 | 1/4 | 1/4 | 1/4 |
| 3/4 | 3/4 | 3/4 | 3/4 | 3/4 |
| 1 | 1 | 1 | 1 | 1 |

FIG. 13

| 0 | 0 | 0 | 0 | 0 |
|---|---|---|---|---|
| 1/4 | 1/4 | 1/4 | 1/4 | 1/4 |
| 3/4 | 3/4 | 3/4 | 3/4 | 3/4 |
| 1 | 1 | 1 | 1 | 1 |

FIG. 14

| 0 | 0 | 1 | 1 | 1 |
|---|---|---|---|---|
| 0 | 0 | 1 | 1 | 1 |
| 0 | 0 | 1 | 1 | 1 |
| 0 | 0 | 1 | 1 | 1 |

FIG. 15

| 0 | 0 | 1 | 1 | 1 |
|---|---|---|---|---|
| 0 | 0 | 1 | 1 | 1 |
| 0 | 0 | 1 | 1 | 1 |
| 0 | 0 | 1 | 1 | 1 |

FIG. 16

| 0 | 0 | 1 | 1 | 1 |
|---|---|---|---|---|
| 0 | 0 | 1 | 1 | 1 |
| 0 | 0 | 1 | 1 | 1 |
| 0 | 0 | 1 | 1 | 1 |

FIG. 17

| 1 | 1 | 1 | 1 | 0 |
|---|---|---|---|---|
| 1 | 1 | 1 | 0 | 0 |
| 1 | 1 | 0 | 0 | 0 |
| 1 | 0 | 0 | 0 | 0 |

FIG. 18

| 1 | 1 | 1 | 3/4 | 0 |
|---|---|---|---|---|
| 1 | 1 | 3/4 | 1/4 | 0 |
| 1 | 3/4 | 1/4 | 0 | 0 |
| 3/4 | 1/4 | 0 | 0 | 0 |

FIG. 19

| 1 | 31/32 | 31/32 | 1 | 0 |
|---|---|---|---|---|
| 31/32 | 31/32 | 1 | 0 | 1/32 |
| 31/32 | 1 | 0 | 1/32 | 1/32 |
| 1 | 0 | 1/32 | 1/32 | 0 |

FIG. 20

TWO-DIMENSIONAL ADJUSTABLE FLICKER FILTER

This application claims benefit of provisional application Ser. No. 60/096,299 filed Aug. 12, 1998.

BACKGROUND OF THE INVENTION

The present invention relates generally to an apparatus and method for flicker filtering. More particularly, the invention relates to an apparatus and method for significantly reducing flicker in a video display by employing a two-dimensional flicker filter.

A video image, such as that found on a television for example, is formed by a succession of flanes projected onto a phosphorescent screen, such as that found in a cathode-ray tube ("CRT"). Multiple horizontal lines of pixels with many pixels per line, in turn, form each fame.

To draw each frame, an electron beam in a CRT scans horizontally along each horizontal line. As it projects each pixel of a horizontal line in turn, the beam supplies energy to the phosphors which phosphoress, thus illuminating the pixel. The amount of energy supplied by the electron beam sets the initial intensity of the pixel, but the intensity pixel progressively degrades between scans as its phosphors give up energy in the form of light. Each pixel therefore acts like a small light that flickers at the frequency at which the pixel is scanned.

However, if the frequency at which a pixel is scanned is high enough, at least 45 Hz, a viewer will not perceive pixel flicker. This is due to the fact that past this threshold, humans can not cognitively process the optical changes fast enough in order to perceive the flicker. Typical television systems typically, however, do not update pixels fast enough. For example an National Television Standards Committee ("NTSC") has established television and video standards in the United States (in Europe and the rest of the world, the dominant television standards are PAL and SECAM) which defines television standard as a composite video signal with a refresh rate of 60 half-frames (interlaced) per second. A television operating on the NTSC standard then updates each pixel 30 times per second, or 30 Hz. Thus, a viewer can readily perceive pixel flicker in an NTSC format display. Phase Alternating Line ("PAL"), the dominant television standard in Europe has a similar problem.

The NTSC and PAL formats use interlacing to help mask pixel flicker. Each frame is divided into two interlaced fields. One field includes all even numbered pixel rows while the other field includes all odd numbered pixel rows. When displaying a frame, all the rows of one field are scanned and then all the rows of the other field are scanned. Thus, two vertically adjacent pixels will flicker almost 180 degrees out of sync. Since the two pixels are adjacent, they will usually have the same or nearly the same intensity, particularly when the image does not have sharp horizontal edges. In an NTSC system, the two pixels will look like a single pixel flashing at 60 Hz instead of two pixels flashing at 30 Hz each. Since 60 Hz is above the 45 Hz threshold level for flicker perception, the viewer will not perceive that the two pixels flicker.

Thus, vertically adjacent pixels tend to compensate for each other's flicker.

However, an image with sharp contrasts at its edges, such as a bright rectangle displayed on a dark background for example, can be problematic.

The upper or lower edge of the rectangle acts as a sharply defined horizontal boundary between areas of high and low intensity. For example, a row of pixels immediately below the horizontal lower edge of the rectangle flickers with high intensity while the row of pixels immediately above the lower rectangle edge flickers with little or no intensity. Thus, the flicker of the low intensity row of pixels will not adequately compensate for flicker of its high intensity neighboring row, and a viewer will perceive flicker in the high intensity row.

One way to reduce flicker along a horizontal intensity boundary is to filter the signal controlling the beam so as to reduce the abruptness with which image intensity changes in the vertical direction. A prior art "one-dimensional"flicker filter sets the intensity of each pixel to a weighted average of itself and its nearest two vertical neighbors. The intensity of each pixel therefore increases when a vertical neighbor is brighter and decreases when a vertical neighbor is dimmer. This reduces flicker because it ensures that vertically adjacent neighbors will flash with more nearly the same intensity. Such filtering blurs sharp horizontal intensity boundaries making an image appear fuzzy, but most viewers are willing to give up sharpness at horizontal intensity boundaries in order to reduce annoying flicker. However, such a flicker filter is not selective and thus, adjusts pixel intensities everywhere in the image, not just in areas of the image where flicker is a problem. This has the effect of reducing image sharpness thereby reducing image quality.

Accordingly, it is an object of this invention to provide a flicker filter that reduces flicker in an image.

It is another object of this invention to provide a flicker filter that maximizes image quality in two dimensions.

It is still another object of the invention to provide a flicker filter that allows a user to selectively adjust input values to compensate for variable boundary conditions.

These and other objects of the invention will be obvious and will appear hereinafter.

SUMMARY

The aforementioned and other objects are achieved by the invention which provides a flicker filter for reducing flicker in a video signal. Often, such a filter is located within a television or a video scan converter.

The flicker filter of the invention has at least two user-adjustable inputs adapted to balance image quality versus flicker in the second video image. A first user-adjustable input is adapted to govern an amount of flicker suppression. A second user-adjustable input is adapted to govern an amount of blur, or sharpness.

The two inputs are independently adjustable such that a user may dynamically adjust the two-dimensional system characteristics. This ability allows the circuit to be time to adjust pixel intensities where an amount of pixel intensity adjustment increases with decreasing boundary angle, inter alia.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 7 illustrates a weighting the intensity path flicker filter,

FIG. 8 illustrates a weighting provided by the filter;

FIG. 9 illustrates a weighting provided by the filter when SHP is 0 and 0<FLK<1;

FIG. 10 illustrates a weighting provided by the filter when FLK is 1 and SHP is 1;

FIG. 11 illustrates a weighting provided by the filter when FLK is 1 and SHP is ½;

FIG. 12 illustrates a map of pixel intensities near the horizontal intensity boundary;

FIG. 13 shows a resulting frame image if a conventional 1-dimensional flicker filter weighting is applied;

FIG. 14 shows a resulting frame image if a 2-dimensional weighting is applied to FIG. 10;

FIG. 15 illustrates intensities of pixels near the vertical intensity boundary;

FIG. 16 shows a resulting frame image if a 1-dimensional weighting distribution of FIG. 10 is applied to FIG. 15;

FIG. 17 illustrates a resulting frame image if a 2-dimensional weighting distribution of FIG. 10 is applied to the image of FIG. 15.

FIG. 18 illustrates intensities of pixels near the boundary;

FIG. 19 illustrates a resulting image when the filter applies the 1-dimensional weighting distribution of FIG. 8 to the image of FIG. 18;

FIG. 20 shows a resulting frame image if a 2-dimensional weighting distribution of FIG. 10 is applied to the image of FIG. 18;

DETAILED DESCRIPTION

While the present invention retains utility within a wide variety of video devices and may be embodied in several different forms, it is advantageously employed in connection in televisions or in connection with the conversion of a digital video signal to a television video signal, for example. In the case of conversion, the conversion is generally performed by a device commonly known as a scan converter and a flicker filter is then disposed therein. Though these are the forms of the preferred embodiments and will be described as such, these embodiments should be considered illustrative and not restrictive.

Many of the above-described problems in displaying video signals can be significantly reduced and image quality can be improved if the flicker filter strongly adjusts intensity of only pixels for which the perception of flicker is a problem. Flicker is most clearly perceived only along a sharp image intensity boundary and, therefore, the farther a pixel is from an intensity boundary, the less likely a viewer is to perceive it as flickering. Also, there becomes less need to adjust its intensity and the intensity of its vertical neighbors in order to limit perceived flicker. Moreover, the closer an image intensity boundary comes to vertical, the less likely a viewer is to perceive flicker in a pixel near that boundary. Generally while most viewers will perceive flicker along a sharp intensity boundary that is less than 20 degrees from horizontal, few viewers can perceive flicker along a boundary that is more than 35 degrees from horizontal. Thus, when a pixel is near an intensity boundary that is more than 20–35 degrees from horizontal, there is little need to adjust its intensity and the intensity of its neighbors in order to limit perceived flicker.

The flicker filter therefore should strongly adjust pixel intensities when they are near a sharp intensity boundary that is near horizontal but should only weakly adjust pixel intensities along boundaries that are closer to vertical. The amount of pixel intensity adjustment therefore should increase with decreasing boundary angle.

In the preferred embodiment of the invention, a two-dimensional flicker filter is used that is user adjustable. These adjustments may be factory adjustments that are optimized for a specific device, a television for example, or may be controlled by an end user through a user interface. In the latter case, the user interface can be knobs or other mechanical interface. An example of a device that may allow such adjustability would be a scan converter where the scan converter is not necessarily optimized for a specific output device.

Figures 1, 2, 3, 4, 5, 6:
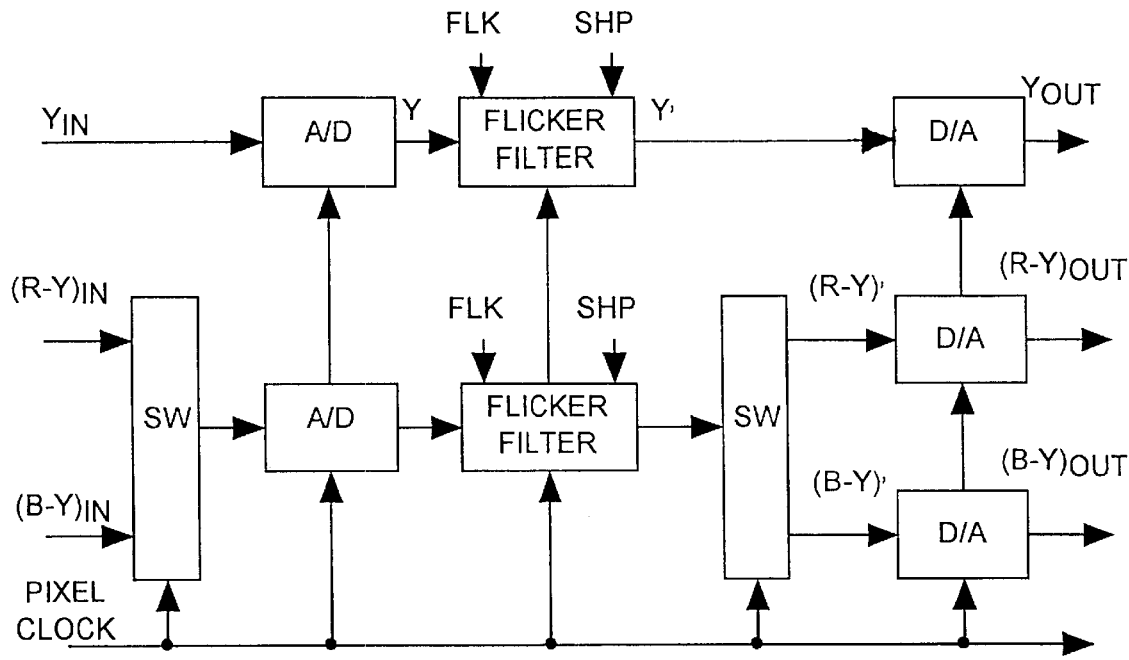
FIG. 1 shows a block diagram illustrating a flicker filter system in accordance with the invention.
FIG. 2 shows an intensity matrix of a signal input into the flicker filter system of FIG. 1.
FIGS. 3, 4, and 5 show illustrate 3×5 weighting function matrices.
FIG. 6 shows a suitable matrix for the chroma path flicker filter.

FIG. 1 is a block diagram illustrating a flicker filter system in accordance with the invention. The filter system has two filter paths, one for the luma (intensity) signal $Y_{IN}$ and one for the chroma (color) signals $(R-Y)_{IN}$ and $(B-Y)_{IN}$. In the luma path, an analog-to-digital ("A/D") converter digitizes the luma signal $Y_{IN}$ at the pixel clock rate to produce a data sequence Y representing intensities of successive pixels along successive rows. A flicker filter then filters Y to produce another data sequence Y'. A digital-to-analog CD("SD/A") converter converts Y' into an output analog luma signal $Y_{OUT}$ for controlling pixel intensity. An image controlled by $Y_{OUT}$ will have less flicker than an image controlled by $Y_{IN}$.

The two chroma signals $(R-Y)_{IN}$ and $(B-Y)_{IN}$ are at half the frequency of the intensity signal $Y_{IN}$ and are horizontally interlaced with one another so that they control alternate pixels along each row. In the chroma path, a commutating switch alternately applies each chroma signal to an A/D converter. After a flicker filter filters the output of the A/D converter, another commutating switch separates the flicker filter outputs into (R-Y)' and (B-Y)' color signal sequences. A pair of D/A converters then convert them into $(R-Y)_{OUT}$ and $(B-Y)_{OUT}$ signals.

The flicker filter in the intensity signal path adjusts the intensity of each pixel in the $Y_{OUT}$ signal so that it is a weighted average of itself and, in the preferred embodiment, fifteen of its neighboring pixels. One skilled in the art will recognize that the actual number of pixels which is used to create the weighted average is implementation specific.

$$Y'(N,M)=A*GT(N,M)+B*GT(N,M)*FLK+C*GT(N,M)*FLK*SHP$$

In the above equation, Y'(N, M) is the intensity data value of filter output sequence Y' for the $N^{th}$ pixel of row M. The value GT(N, M) is the transpose of an intensity matrix G(N, M) illustrated in FIG. 2. Referring to FIG. 2, the variable Y(N, M) is intensity data value conveyed in input sequence Y for the $N^{th}$ pixel of row M. Thus, G(N, M) is a matrix of fifteen input sequence Y intensity data values, including the intensity at position (N, M), the intensities of its four horizontally nearest neighbor pixels along row M, and the intensities of five pixels nearest neighbor pixels along rows M−1 and M+1. Matrices A, B and C are 3×5 weighting functions illustrated in FIGS. 3, 4 and 5, respectively. A flicker coefficient FLK and a sharpness coefficient SHP are scalar quantities provided as user input ranging between 0 and 1.

The flicker filter in the chroma path is similar to the flicker filter in the luma path except for a difference in matrix C. A suitable C matrix for the chroma path flicker filter is illustrated in FIG. 6. The difference arises because the two chroma signals are horizontally interlaced. There are 0's in the N−1 and N+1 columns in FIG. 6 because pixels of alternate columns are controlled by different chroma signals. Although color flicker is normally not noticeable, the chroma signals are flicker filtered in generally the same manner as the intensity signal to maintain the spatial correlation between intensity and color.

To illustrate operation of the filter in the intensity signal path, let us first assume that flicker coefficient FLK=0. FIG. 7 illustrates the weighting the intensity path flicker filter gives to each of a 5×3 block of pixels when computing the adjusted intensity of the pixel at center position (N, M). Since the pixel at (N, M) has a weight of 1 and all other pixels have weight 0, equation [1] reduces to $$Y'(N,M)=Y(N,M).$$

Since input and output intensities are the same, the flicker filter does not provide any adjustment to pixel intensity when FLK=0.

Now assume that FLK=1 and SHP=0. FIG. 8 illustrates the weighting provided by the filter. In such case equation [1] reduces to $$Y'(N,M)=[¼]Y(N,M+1)+[½]Y(N,M)+[¼]Y(N,M-1)$$

Here the intensity of the pixel at position (N,M) is adjusted so that it is a weighted average of itself and its two vertically adjacent neighbors. The pixel at (N, M) is given twice the weight of its neighbors. This is the same weighting that is provided by a typical prior art one-dimensional flicker filter.

Suppose we now set SHP=0 and 0<FLK <1. FIG. 9 illustrates the weighting provided by the filter. Equation [1] reduces to the following:

$$Y'(NM)=[FLK/4]Y(NM+1)+[1-FLK/2]Y(N,M)+[FLK/4]Y(N,M-1)$$

We see that the flicker coefficient FLK determines how weighting is distributed between the pixel at (N,M) and its two vertical neighbors. As FLK increases from 0 to 1 we decrease the contribution of the pixel at NM and increase the contributions of its vertically neighboring pixels. Thus, by increasing FLK we increase the amount flicker suppression by decreasing differences in intensity between vertically adjacent pixels.

Let us now set FLK 1 and SHP=1. FIG. 10 illustrates the weight given to each neighboring pixel when computing Y'(N, M). If we compare FIGS. 8 and 10, we note that when SHP increases from 0 to 1, the filter gives weight to pixels that are horizontally displaced from column N. Note also by inspection of FIG. 10 that the intensity of the pixel at (N, M) is increased in proportion to the intensity of each of the 10 pixels of the neighboring rows M+1 and M−1 with the contribution being largest for the pixels of column N. Note however that the weights given to neighboring pixels along row M itself are negative—the intensity of the pixel at (N, M) is reduced in inverse relation to the intensity of its horizontally neighboring pixels. Flashing is more apparent when all pixels along a row are bright. Thus, when SHP is high, the filter reduces the appearance of flashing by dimming a pixel when its horizontal neighbors are bright.

FIG. 11 illustrates the weighting the filter provides when FLK=1 and SHP=½. Comparing FIGS. 10 and 11, we see that by decreasing SliP from 1 to ½ we increase the weighting given to pixels along column N and decrease the weighting of pixels horizontally displaced from column N. By comparing FIGS. 7–11 we see that the flicker coefficient FLK controls the overall amount of adjustment that is made to the intensity of the pixel at position (N, M), and particularly affects the vertical distribution of weighting factors. The greater the value of FLK, the greater the weight that is given to pixels on rows M+1 and M−1. The sharpness coefficient SHP controls the horizontal distribution of weighting factors. The greater the value of SBP, the greater the weight that is given to pixels in columns N+1, N+2, N−1 and N−2.

Assume intensity values Y range between 0 and 1. Suppose, for example, that the upper half of an image frame represented by the Y signal is very dark (intensity=0) and that the lower half of the image frame is very light (intensity =1). Then a map of pixel intensities near the horizontal intensity boundary would appear as in FIG. 12. Without flicker filtering (i.e., with a weighting as illustrated in FIG. 7), the uppermost row of pixels of intensity 1 would appear to flicker.

If we apply conventional 1-dimensional flicker filter weighting as illustrated in FIG. 8, the resulting frame image would appear as in FIG. 13. Note that the intensity of the row of pixels above the boundary is increased from 0 to ¼ while the intensity of the row of pixels below the boundary is decreased from 1 to ¾. Since the two rows flicker out of sync, apparent flickering is reduced, although sharpness at the boundary is lost.

If we now apply the 2-dimensional weighting of FIG. 10, where FLK=1 and SHP=1, the image would appear as in FIG. 14. Note that FIGS. 13 and 14 are similar. Where the intensity boundary is horizontal, increasing the sharpness factor SBP has no effect on pixel intensities.

Suppose now that the image is dark on the left and bright on the right. FIG. 15 illustrates intensities of pixels near the vertical intensity boundary. If we apply the 1-dimensional weighting distribution of FIG. 8 to the image, the result appears as in FIG. 16. Note that there is no difference between FIGS. 15 and 16. The 1-dimensional weighting distribution of FIG. 8 (FLK=1, SHP=0) has no affect on pixels near a vertical intensity boundary. This is desirable because no adjustment is needed.

FIG. 17 illustrates the result if we apply the 2-dimensional weighting distribution of FIG. 10 (FLK=1, SHP=1) to the image of FIG. 15. Note here too, no adjustment to pixel intensity is made because it isn't needed.

Let us now suppose that an image has a 45 degree diagonal boundary between areas of high and low intensity. FIG. 18 illustrates intensities of pixels near the boundary. FIG. 19 illustrates a resulting image when the filter applies the 1-dimensional weighting distribution of FIG. 8 to the image of FIG. 18. FIG. 18 illustrates that pixels above the boundary are reduced in intensity by ¼ while pixels below the boundary are increased in intensity by ¼. Since most observers do not perceive flicking along a sharp intensity boundary that is more than 20–35 degrees from horizontal, most observers would not perceive flickering in the image of FIG. 18. Thus, the modification of pixel intensities seen in FIG. 19 resulting from the weighting distribution of FIG. 8 is unnecessary. In effect, the weighting distribution of FIG. 8 substantially reduces pixel sharpness along the 45 degrees intensity boundary without providing a noticeable improvement in flicker.

Suppose now we apply the 2-dimensional weighting distribution of FIG. 10 to the image of FIG. 18. The result is shown in FIG. 20. Note that in comparing FIG. 20 to FIG. 19, we see that the image of FIG. 20 does not make as great an adjustment to pixel intensities along the intensity boundary, and tends to shift the adjustment horizontally away from the boundary. The image of FIG. 20 will have a sharper boundary. As SHP is increased, the filter tends to limit the amount of intensity adjustment carried out near an intensity boundary, particularly when the angle of the intensity boundary becomes more vertical, where flicker is less noticeable.

A user selectively calibrates the flicker filter by initially setting sharpness coefficient SHP to 1 and then increasing the flicker coefficient FLK only as high as needed to reduce apparent flicker to an acceptable level. In doing so the user gives up some sharpness everywhere in the image. However, the user can regain much of that sharpness everywhere except near substantially horizontal intensity boundaries by thereafter decreasing the sharpness coefficient SHP. This tends to reduce the amount of intensity averaging carried out at steeper boundary angles where it is not needed. The lower the SHP value the more nearly horizontal a boundary must be before the filter begins to provide substantial intensity adjustment. However, if SHP is set too low, the user will begin to notice unacceptable flicker along intensify boundaries that are nearly horizontal. Thus, the user sets SHP to the lowest level that will not result in unacceptable flicker.

Figure 21:
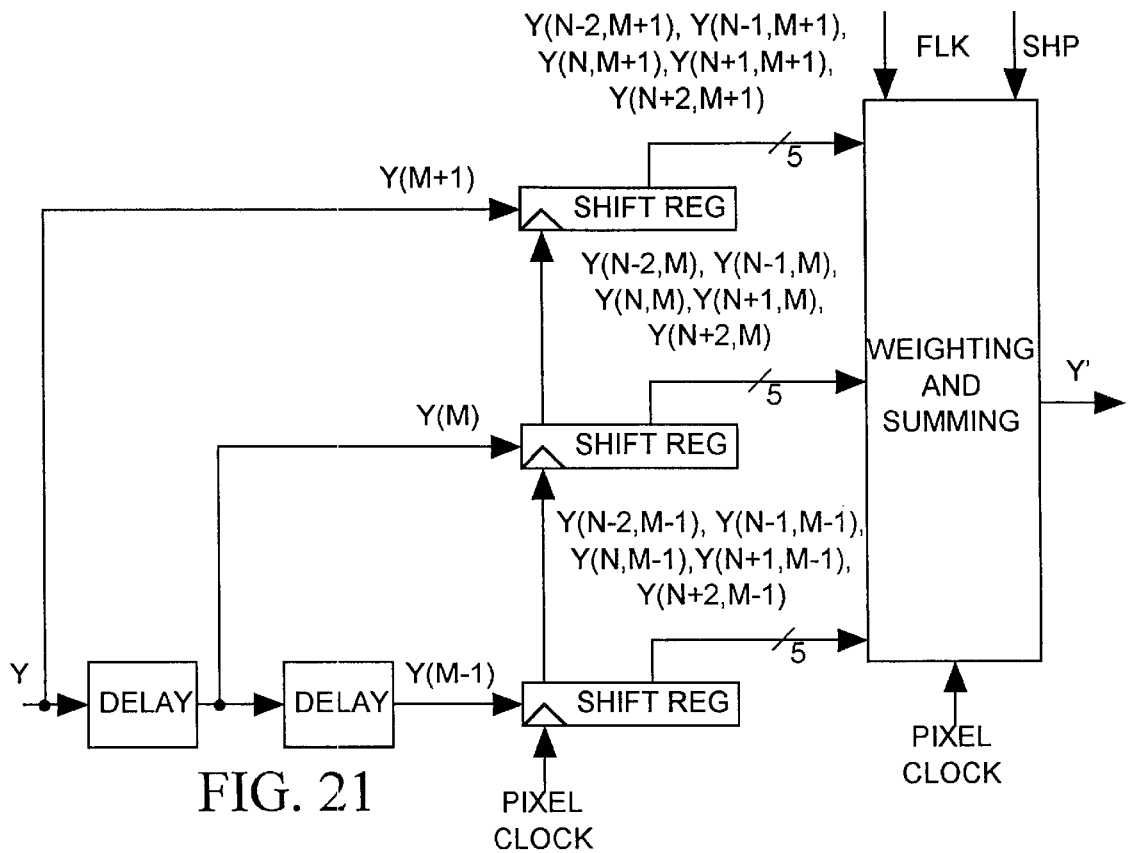
FIG. 21 is a more detailed block diagram of the intensity path flicker filter of FIG. 1.
Figure 22:
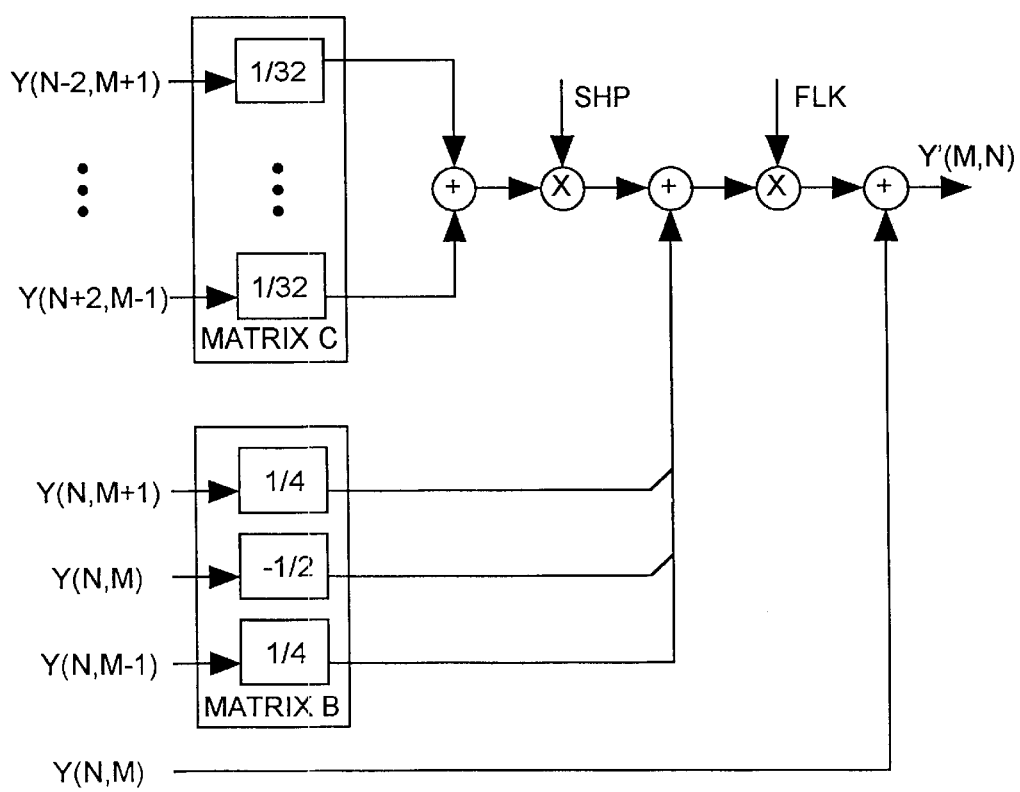
FIG. 22 illustrates a weighting and summing circuit which weights and sums the 15 outputs of the shift registers of FIG. 21.

FIG. 21 is a more detailed block diagram of the intensity path flicker filter of FIG. 1. The Y sequence is progressively delayed by two delay circuits. Each delay circuit delays each pixel data value of the Y sequence by an amount of time between updates of vertically adjacent pixel rows. The Y value and the outputs of the two delay circuits are applied to inputs of three serial-in/parallel-out shift registers. In the preferred embodiment, each shift register holds five successive intensity data values. A weighting and summing circuit, illustrated in detail in FIG. 22, weights and sums the fifteen outputs of the shift registers in accordance with equation [1] to produce the Y' data sequence. The chroma path flicker filter is similar to the intensity path flicker filter except that it implements the C weighting matrix of FIG. 6.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A method for processing input data indicating a visual attribute magnitude (VAM) of each pixel of a first pixel array having horizontal rows and vertical columns of pixels to produce output data indicating a VAM of each pixel of a second pixel array, wherein each pixel of said second pixel array corresponds to a separate pixel of said first pixel array, the method comprising the steps of:

(a) receiving a first control value (FLK) from a user;
(b) receiving a second control value (SHP) from the user, wherein said first and second control values have user-adjustable magnitudes;
(c) receiving the input data;
(d) from the input data received at step (c), computing the VAM for each particular pixel of the second array as a weighted sum of visual attribute magnitudes (VAMs) of a group of pixels of the first pixel array including the particular pixel's corresponding pixel and other pixels of the first pixel array including pixels horizontally spaced from the corresponding pixel and pixels residing on a same first pixel array column as the corresponding pixel, wherein the first control value received at step (a) adjusts a weight of the VAM of the corresponding pixel in the weighted sum relative to weights of VAMs of the other pixels of the group in the weighed sum, and wherein the second control value received at step (b) adjusts weights of VAMs of pixels of the group that are horizontally displaced from the corresponding pixels relative to weights of VAMs of pixels of the group residing on the same first pixel array column as the corresponding pixel, and (e) generating said output data referencing the VAM of each pixel of the second pixel array computed at step d.

2. The method in accordance with claim 1 wherein said visual attribute magnitude of each pixel of the first and second arrays comprises a magnitude of its luma.

3. The method in accordance with claim 1 wherein said visual attribute magnitude of each pixel of the first and second arrays comprises a magnitude of at least one component of its chroma.

4. The method in accordance with claim 1 wherein said visual attribute magnitude of each pixel of the first and second arrays comprises a magnitude of at least one component of its color.

5. The method in accordance with claim 1 wherein said visual attribute magnitude of each pixel of the first and second arrays comprises a magnitude of its intensity.

6. A flicker filter for processing input data indicating a visual attribute magnitude (VAM) of each pixel of a first pixel array having horizontal rows and vertical columns of pixels to produce output data indicating a VAM of each pixel of a second pixel array, wherein each pixel of said second pixel array corresponds to a separate pixel of said first pixel array, the flicker filter comprising:

means for receiving a first control value (FLK) and a second control value (SHP) from a user and for computing in response thereto a VAM for each particular pixel of the second array as a weighted sum of visual attribute magnitudes (VAMs) of a group of pixels of the first pixel array, wherein said group of pixels includes the particular pixel's corresponding pixel and other pixels of the first pixel array including pixels horizontally spaced from the corresponding pixel and pixels residing on a same first pixel array column as the corresponding pixel, wherein said first and second control values have user-adjustable magnitudes, wherein when said means computes the weighted sum for the particular pixel, the first control value controls a weight of the VAM of its corresponding pixel in the weighted sum relative to weights of VAMs of the other pixels of the group in the weighed sum, and wherein when said means computes the weighted sum for the particular pixel, the second control value controls weights of VAMs of pixels of the group that are horizontally spaced from the corresponding pixels relative to weights of VAMs of pixels of the group residing on a same first pixel array column as the corresponding pixel; and means for generating the output data in response to the a VAM computed for each pixel of the second array.

7. The flicker filter in accordance with claim 6 wherein said visual attribute magnitude of each pixel of the first and second arrays comprises a magnitude of its luma.

8. The flicker filter in accordance with claim 6 wherein said visual attribute magnitude of each pixel of the first and second arrays comprises a magnitude of at least one component of its chroma.

9. The flicker filter in accordance with claim 6 wherein said visual attribute magnitude of each pixel of the first and second arrays comprises a magnitude of at least one component of its color.

10. The flicker filter in accordance with claim 6 wherein said visual attribute magnitude of each pixel of the first and second arrays comprises a magnitude of its intensity.

11. A scan converter for converting an analog input video signal into an analog output video signal wherein the input video signal conveys input data indicating a visual attribute magnitude (VAM) of each pixel of a first pixel array having horizontal rows and vertical columns of pixels, and wherein said output video signal conveys output data indicating a VAM of each pixel of a second pixel array, wherein each pixel of said second pixel array corresponds to a separate pixel of said first pixel array, the scan converter comprising:

digitizing means for extracting the input data from the input video signal, a flicker filter for processing the input data to produce the output data to be conveyed by the output video signal, the flicker filter receiving a first control value (FLK) and a second control value (SHP) from a user, wherein said first and second control values have user-adjustable magnitudes, and computing a VAM for each particular pixel of the second array as a weighted sum of visual attribute magnitudes (VAMs) of a group of pixels of the first pixel array including the particular pixel's corresponding pixel and other pixels of the first pixel array including pixels horizontally spaced from the corresponding pixel and pixels residing on a same first pixel array column as the corresponding pixel, wherein when said means computes the weighted sum for the particular pixel, the first control value controls a weight of the VAM of its corresponding pixel in the weighted sum relative to weights of VAMs of the other pixels of the group in the weighed sum, and wherein when said means computes the weighted sum for the particular pixel, the second control value controls weights of VAMs of pixels of the group that are horizontally spaced from the corresponding pixels relative to weights of VAMs of pixels of the group residing on a same first pixel array column as the corresponding pixel, and means for generating the output video signal in response to the output data produced by the flicker filter.

12. The scan converter in accordance with claim 11 wherein said visual attribute magnitude of each pixel of the first and second arrays comprises a magnitude of its luma.

13. The scan converter in accordance with claim 11 wherein said visual attribute magnitude of each pixel of the first and second arrays comprises a magnitude of at least one component of its chroma.

14. The scan converter in accordance with claim 11 wherein said visual attribute magnitude of each pixel of the first and second arrays comprises a magnitude of at least one component of its color.

15. The scan converter in accordance with claim 11 wherein said visual attribute magnitude of each pixel of the first and second arrays comprises a magnitude of its intensity.

16. A method for processing input data indicating a visual attribute magnitude (VAM) of each pixel of a first pixel array having horizontal rows and vertical columns of pixels to produce output data indicating a VAM of each pixel of a second pixel array, wherein each pixel of said second pixel array corresponds to a separate pixel of said first pixel array, the method comprising the steps of:

(a) receiving the input data;

(b) from the input data received at step (a), computing the VAM for each particular pixel of the second array as a weighted sum of visual attribute magnitudes (VAMs) of a group of pixels of the first pixel array including the particular pixel's corresponding pixel and other pixels of the first pixel array including at least one pixel that is both horizontally and vertically spaced from the corresponding pixel; and (c) generating said output data referencing the VAM of each pixel of the second pixel array computed at step b.

17. The method in accordance with claim 16 further comprising the step:

(d) receiving a control value (SHP) from the user, wherein said control value has a user-adjustable magnitude, wherein when computing the weighted sum for the particular pixel at step b, the second control value adjusts weights of VAMs of pixels of the group that are horizontally displaced from the corresponding pixels relative to weights of VAMs of pixels of the group residing on the same first pixel array column as the corresponding pixel.

18. The method in accordance with claim 16 further comprising the step of:

(d) receiving a control value (FLK) from a user, wherein when computing the weighted sum for the particular pixel at step b, the control value adjusts a weight of the VAM of the corresponding pixel in the weighted sum relative to weights of VAMs of the other pixels of the group in the weighed sum.

19. The method in accordance with claim 18 further comprising the steps of:

(e) receiving a control value (SHP) from the user, wherein said control value has a user-adjustable magnitude, wherein when computing the weighted sum for the particular pixel at step b, the second control value adjusts weights of VAMs of pixels of the group that are horizontally displaced from the corresponding pixels relative to weights of VAMs of pixels of the group residing on the same first pixel array column as the corresponding pixel.

* * * * *